(12) United States Patent
Lee et al.

(10) Patent No.: US 11,422,317 B2
(45) Date of Patent: Aug. 23, 2022

(54) OPTICAL FIBER COUPLING DEVICE

(71) Applicant: Gloriole Electroptic Technology Corp., Kaohsiung (TW)

(72) Inventors: Yen-Chang Lee, Kaohsiung (TW); Li-Yun Chen, Kaohsiung (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 0 days.

(21) Appl. No.: 16/934,658

(22) Filed: Jul. 21, 2020

(65) Prior Publication Data
US 2021/0311264 A1 Oct. 7, 2021

(30) Foreign Application Priority Data
Apr. 1, 2020 (TW) .................................. 109203827

(51) Int. Cl.
*G02B 6/38* (2006.01)
(52) U.S. Cl.
CPC .................................. *G02B 6/3893* (2013.01)
(58) Field of Classification Search
CPC .................................................. G02B 6/3893
USPC ........................................................ 385/139
See application file for complete search history.

(56) References Cited

U.S. PATENT DOCUMENTS

| | | | | |
|---|---|---|---|---|
| 5,082,344 A * | 1/1992 | Mulholland | ......... | G02B 6/3831 385/60 |
| 8,556,520 B2 * | 10/2013 | Elenbaas | .............. | G02B 6/3891 385/55 |
| 8,620,130 B2 * | 12/2013 | Cooke | .................. | G02B 6/4465 385/138 |
| 9,726,831 B2 * | 8/2017 | Gniadek | .............. | G02B 6/3885 |
| 9,897,766 B2 * | 2/2018 | Gniadek | .............. | G02B 6/3891 |
| 11,175,466 B2 * | 11/2021 | Gniadek | .............. | G02B 6/3821 |
| 11,209,599 B2 * | 12/2021 | Takano | ................ | G02B 6/3889 |
| 2005/0013549 A1 * | 1/2005 | Terakura | .............. | G02B 6/3843 385/78 |
| 2008/0175542 A1 * | 7/2008 | Lu | ......................... | G02B 6/3894 385/62 |
| 2009/0003772 A1 * | 1/2009 | Lu | ......................... | G02B 6/3869 385/60 |
| 2009/0185777 A1 * | 7/2009 | Ziemke | ................ | H01R 13/502 385/56 |
| 2015/0355417 A1 * | 12/2015 | Takano | ................ | G02B 6/3821 385/60 |
| 2019/0170961 A1 * | 6/2019 | Coenegracht | ........ | G02B 6/4444 |
| 2020/0012050 A1 * | 1/2020 | Takano | ................ | G02B 6/3889 |

* cited by examiner

*Primary Examiner* — Kaveh C Kianni
(74) *Attorney, Agent, or Firm* — Muncy, Geissler, Olds & Lowe, P.C.

(57) ABSTRACT

An optical fiber coupling device includes a casing and a coupling component. The casing has a receiving slot that extends therethrough along a first direction. The coupling component is removably disposed in the receiving slot of the casing, and has at least one coupling slot that extends therethrough along the first direction. The at least one coupling slot has two opposite plugging sections that are arranged along the first direction. The plugging sections are compatible with one of LC, MPO and SC connectors.

7 Claims, 5 Drawing Sheets

OPTICAL FIBER COUPLING DEVICE

CROSS-REFERENCE TO RELATED APPLICATION

This application claims priority of Taiwanese Patent Application No. 109203827, filed on Apr. 1, 2020.

FIELD

The disclosure relates to a coupling device, and more particularly to an optical fiber coupling device.

BACKGROUND

Referring to FIG. 1, a conventional optical fiber coupling device 1 includes a casing 12 surrounding a through slot 11, and a coupling member 13 received in the through slot 11 and fixed to the casing 12. During use, two optical fiber connectors 14 (only one is shown in FIG. 1) are respectively inserted into opposite ends of the optical fiber coupling device 1 so that the optical fiber connectors 14 are coupled together via the coupling member 13.

However, since the coupling member 13 is fixed to the casing 12, when the coupling member 13 is damaged, either attributed to improper use or normal wear and tear, the whole optical fiber coupling device 1 has to be replaced, resulting in high maintenance costs. Also, since the coupling member 13 is not replaceable by itself, the optical fiber coupling device 1 can only work with one type of optical fiber connector (e.g. an LC connector).

SUMMARY

Therefore, the object of the disclosure is to provide an optical fiber coupling device that is modularized and that has lower maintenance costs than the prior art.

According to the disclosure, an optical fiber coupling device includes a casing and a coupling component.

The casing has a receiving slot that extends therethrough along a first direction.

The coupling component is removably disposed in the receiving slot of the casing, and has at least one coupling slot that extends therethrough along the first direction. The at least one coupling slot has two opposite plugging sections that are arranged along the first direction. The plugging sections are compatible with one of LC, MPO and SC connectors.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
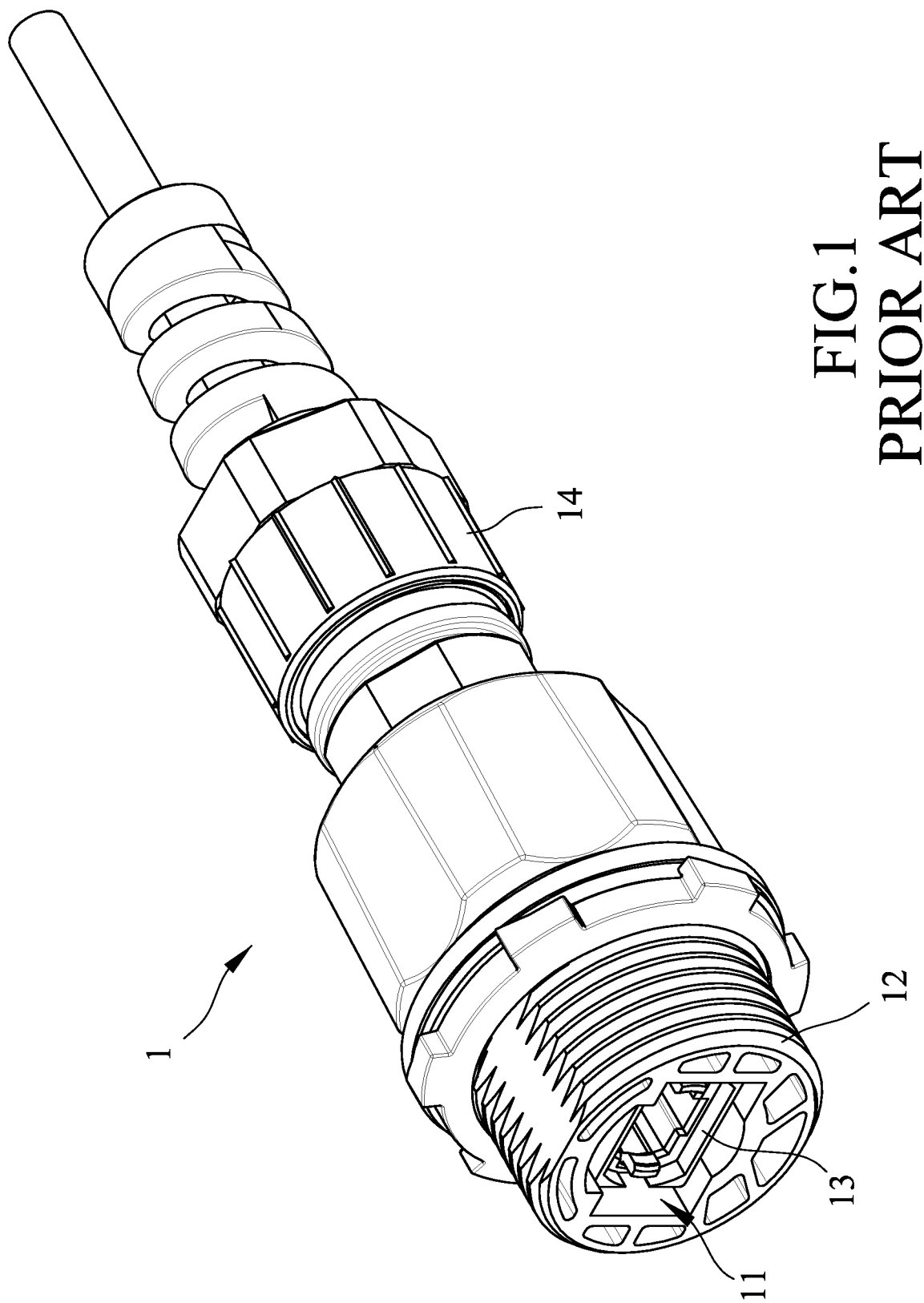
FIG. 1 is a perspective view of a conventional optical fiber coupling device.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 2:
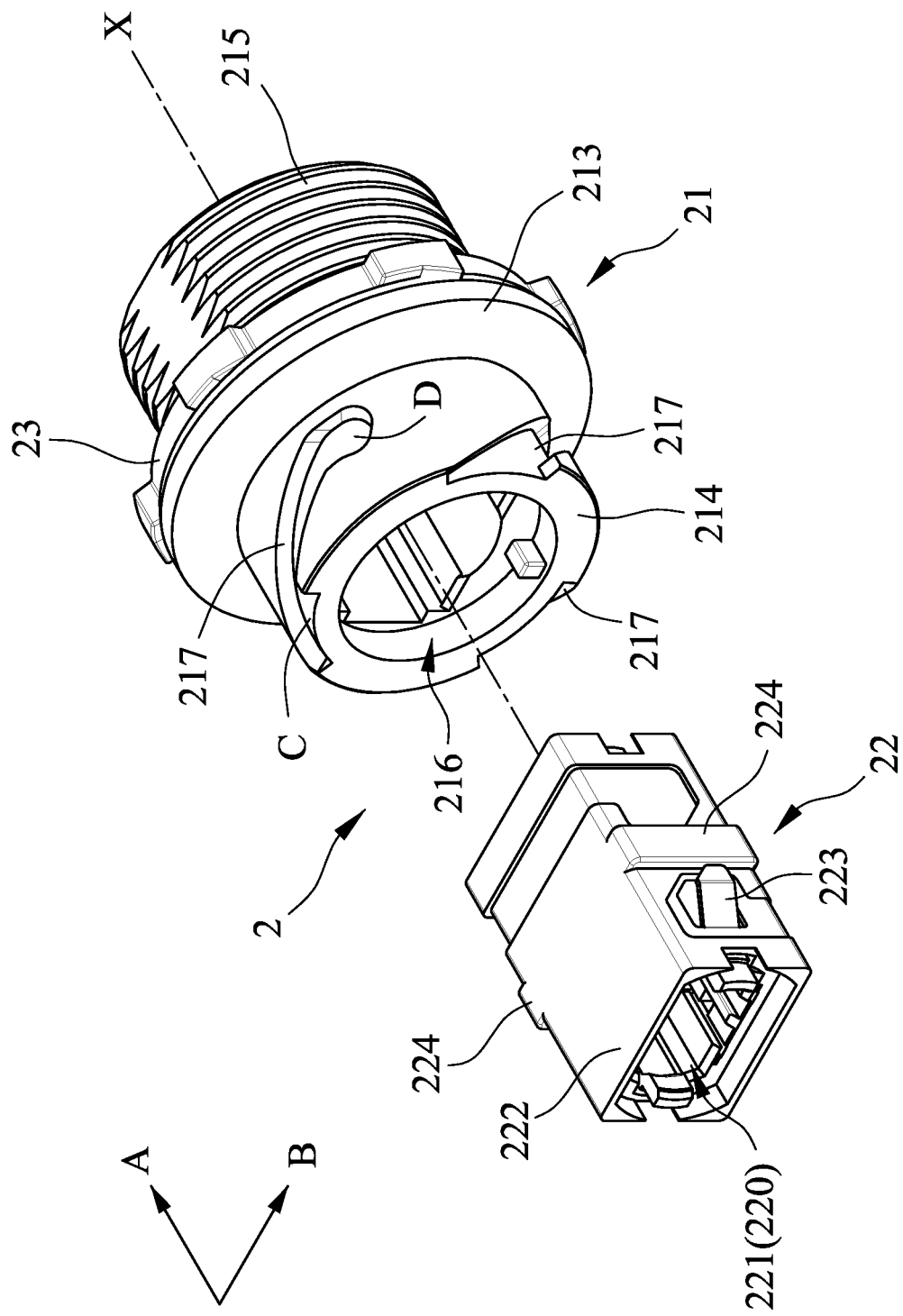
FIG. 2 is an unassembled perspective view of a first embodiment of an optical fiber coupling device according to the disclosure.
Figure 3:
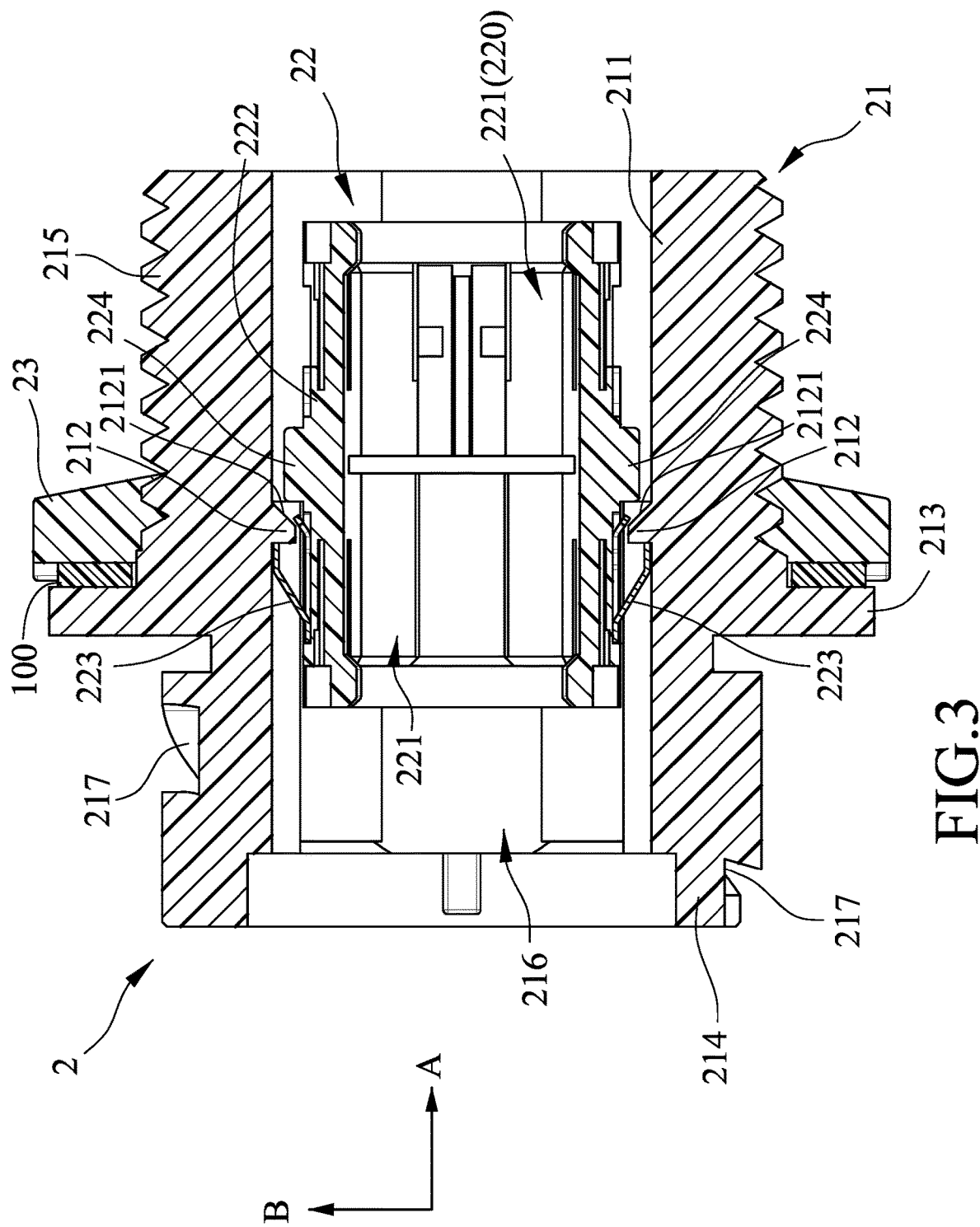
FIG. 3 is an assembled sectional view of the first embodiment.

Referring to FIGS. 2 and 3, a first embodiment of an optical fiber coupling device 2 includes a casing 21, a coupling component 22 and a securing ring 23.

The casing 21 includes a surrounding wall 211, two locking pieces 212, an outer ring wall 213, a surrounding end segment 214 and an external thread 215.

The surrounding wall 211 of the casing 21 surrounds a receiving slot 216 that extends through the casing 21 along a first direction (A).

The locking pieces 212 are connected to the surrounding wall 211, are disposed in the receiving slot 216, and are opposite to each other along a second direction (B) that is perpendicular to the first direction (A). Each of the locking pieces 212 has a guiding surface 2121 that extends transversely to the second direction (B).

The outer ring wall 213 surrounds and is connected to an outer surface of the surrounding wall 211. The external thread 215 is formed in the outer surface of the surrounding wall 211.

The surrounding end segment 214 is connected to one of opposite ends of the surrounding wall 211 along the first direction (A), and cooperates with the surrounding wall 211 to define the receiving slot 216. The surrounding end segment 214 has an outer surface that surrounds an axis (X) extending along the first direction (A), and that is formed with three angularly spaced-apart helical grooves 217.

Each of the helical grooves 217 has an open end (C) and a closed end (D) that are opposite to each other along the first direction (A). The open ends (C) of the helical grooves 217 are disposed at a free end of the surrounding end segment 214 such that the helical grooves 217 are adapted to be engaged with a cap (e.g. for covering the receiving slot 216) or a connecter via the open ends (C).

It should be noted that, in the present embodiment, the casing 21 is integrally formed (i.e., the surrounding wall 211, the locking pieces 212, the outer ring wall 213, the surrounding end segment 214 and the external thread 215 are integrally formed as one piece), but is not limited thereto.

The coupling component 22 is removably disposed in the receiving slot 216 of the casing 21, and includes a main body 222, two resilient members 223 and two stopping members 224.

Referring to FIGS. 2 to 5, it should be noted that, the coupling component 22 of the present embodiment is compatible with any one of the LC, MPO and SC connectors. Thus, the main body 222 of the coupling component 22 is not limited to one configuration. For example, the main body 222 shown in FIGS. 2 and 3 is configured to couple the MPO connectors; a variation of the main body 222 shown in FIG.

Figure 5:
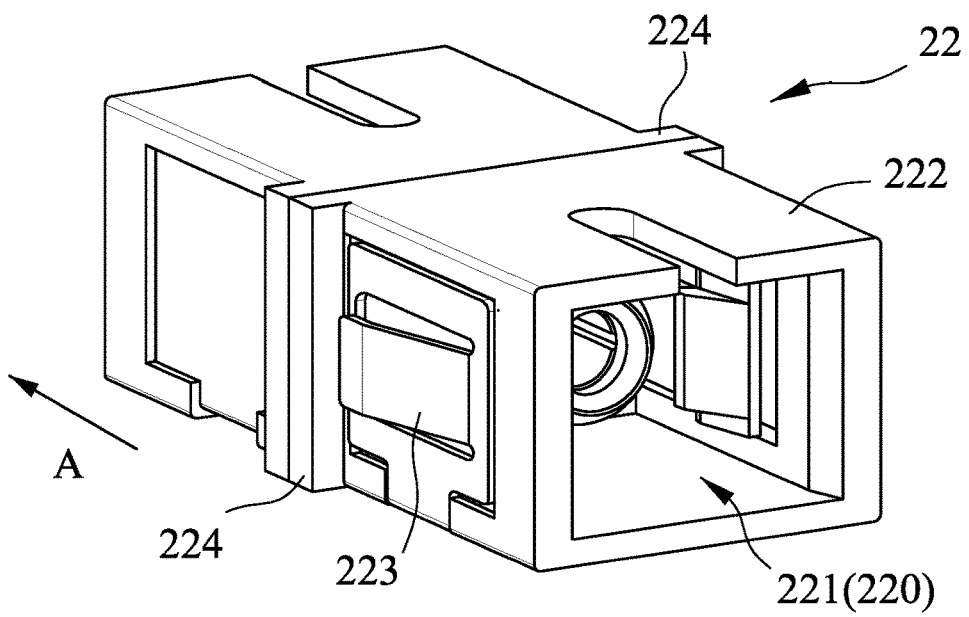
FIG. 5 is a perspective view of another variation of the coupling component of the first embodiment, illustrating the coupling component being compatible with an SC connector.

4 is configured to couple the LC connectors; and another variation of the main body 222 shown in FIG. 5 is configured to couple the SC connectors.

Specifically, for the coupling component 22 shown in FIGS. 2 and 3 or in FIG. 5, the main body 222 defines one coupling slot 220 that extends through the coupling component 22 along the first direction (A). The coupling slot 220 has two opposite plugging sections 221 that are arranged along the first direction (A), and the plugging sections 221 are compatible with an MPO connector (see FIGS. 2 and 3) or an SC connector (see FIG. 5).

Figure 4:
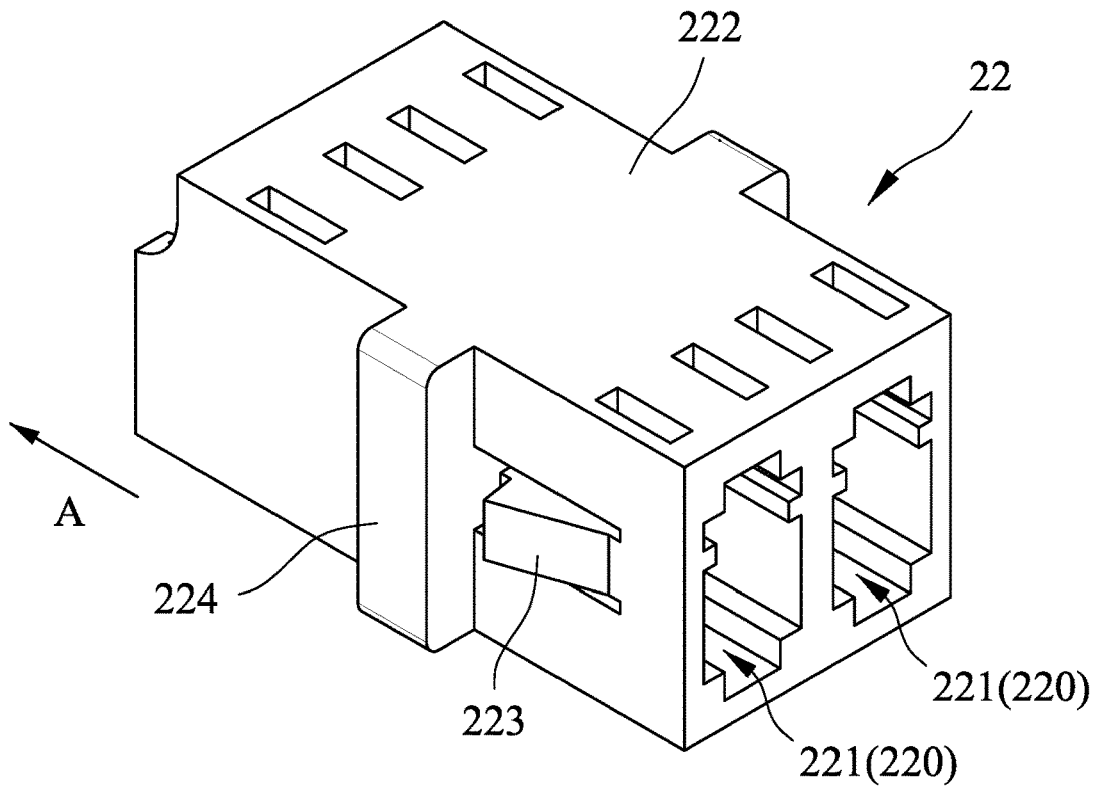
FIG. 4 is a perspective view of a variation of a coupling component of the first embodiment, illustrating the coupling component being compatible with an LC connecter.

As for the coupling component 22 shown in FIG. 4, the main body 222 defines two coupling slots 220 that extend through the coupling component 22 along the first direction (A). Each of the coupling slots 220 has two opposite plugging sections 221 (i.e., a total number of the plugging sections 221 is four) that are arranged along the first direction (A), and that are compatible with the LC connectors.

Referring now again to FIGS. 2 and 3, the resilient members 223 of the coupling component 22 are connected respectively to opposite outer ends of the main body 222 along the second direction (B), and are resiliently flexible. The stopping members 224 are connected respectively to opposite outer ends of the main body 222 such that each of the resilient members 223 is spaced apart from a respective one of the stopping members 224 along the first direction (A).

Each of the locking pieces 212 of the casing 21 is disposed between a respective one of the resilient members 223 and a respective one of the stopping members 224 such that movements of the coupling component 22 relative to the casing 21 along the first direction (A) (i.e., in the first direction (A) or in a direction opposite to the first direction (A)) are restricted. When the resilient members 223 are pushed toward the main body 222, movement of the coupling component 22 relative to the casing 21 in the first direction (A) is not restricted by the resilient members 223, thereby allowing removal of the coupling component 22 from the receiving slot 216 of the casing 21 (specifically, from the end of the casing 21 opposite to the surrounding end segment 214 out of the receiving slot 216).

The securing ring 23 surrounds the casing 21, is removably and threadedly engaged with the external thread 215 of the casing 21, and is adapted to cooperate with the outer ring wall 213 of the casing 21 to clamp an environmental component 100 (see FIG. 3, e.g., a mounting bracket) therebetween for positioning the optical fiber coupling device 2 relative to the environmental component 100.

It should be noted that, in the present embodiment, the resilient members 223 may be individual components that are assembled to the main body 222, which is integrally formed as one piece with the stopping members 224 (see FIGS. 2 and 3) or may be integrally formed as one piece with the main body 222 and the stopping members 224 (see FIGS. 4 and 5).

To assemble the optical fiber coupling device 2, a user simply inserts the coupling component 22 into the receiving slot 216 of the casing 21 in the direction opposite to the first direction (A). When the resilient members 223 of the coupling component 22 hit the locking pieces 212 of the casing 21, they slide respectively across the guiding surfaces 2121 of the locking pieces 212 and are, at the same time, pushed respectively by the locking pieces 212 toward the main body 222 of the coupling component 22, allowing the coupling component 22 to keep moving in said direction opposite to the first direction (A).

When the resilient members 223 pass the locking pieces 212 and are no longer pushed thereby, they spring away from the main body 222 by virtue of the resilient, restoring forces thereof, so that each of the locking pieces 212 is now disposed between a respective one of the resilient members 223 and a respective one of the stopping members 224; the coupling component 22 is thus secured in the casing 21.

To remove the coupling component 22 from the casing 21, the user may press the resilient members 223 toward the main body 222 with a tool such that the resilient members 223 are not restricted by the locking pieces 212; then the coupling component 22 can be pulled out from the receiving slot 216 of the casing 21 in the first direction (A). In the same manner, the user may repeat the above-mentioned processes to install any of the variations of the coupling component 22 that are compatible with the LC, MPO, or SC connectors.

Figure 6:
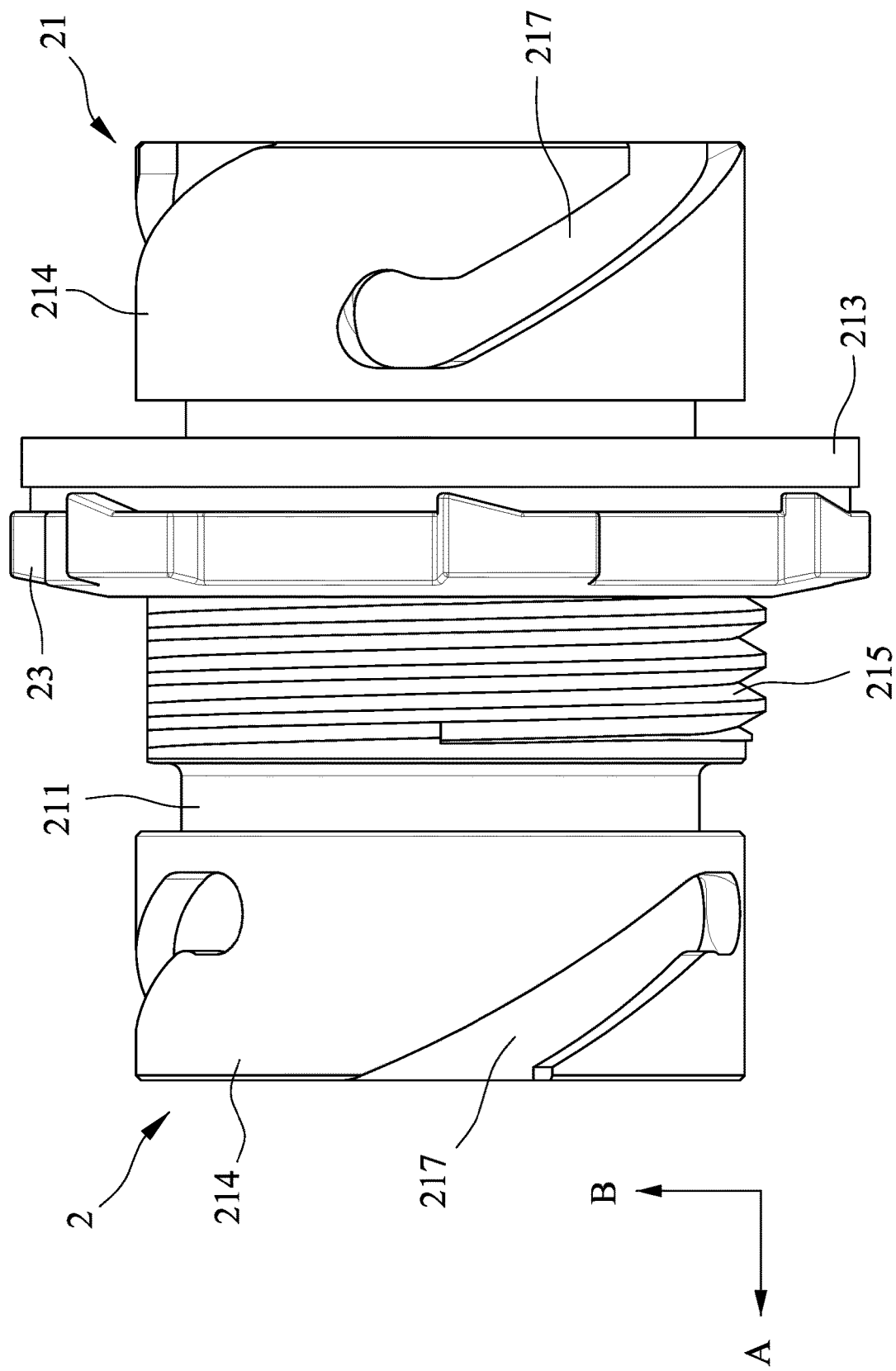
FIG. 6 is an assembled side view of a second embodiment of the optical fiber coupling device according to the disclosure.

Referring to FIG. 6, a second embodiment of the optical fiber coupling device 2 is similar to the first embodiment, and the main different between the two resides in configuration of the casing 21.

In the second embodiment, the casing 21 includes two surrounding end segments 214 that are connected respectively to opposite ends of the surrounding wall 211 along the first direction (A), and that cooperate with the surrounding wall 211 to define the receiving slot 216 (see FIG. 2). Similar to the previous embodiment, each of the surrounding end segments 214 has an outer surface that is formed with three angularly spaced-apart helical grooves 217 (only partly shown in FIG. 6). In virtue of the inclusion of two surrounding end segments 214, the casing 21 of the present embodiment is suitable for in-line coupling.

In summary, the optical fiber coupling device 2 of the present disclosure provides modularized casing 21 and coupling component 22 that are removably coupled to each other. Various configurations of the coupling component 22 that are compatible with any of the LC, MPO and SC connectors may be provided to enhance flexibility of use. In addition, when the coupling component 22 is damaged, the user does not need to replace the entire optical fiber coupling device 2, which means lower maintenance costs in comparison with the prior art.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical fiber coupling device comprising:
    a casing that has a receiving slot extending therethrough along a first direction; and
    a coupling component that is removably disposed in said receiving slot of said casing, and that has at least one coupling slot extending therethrough along the first direction, said at least one coupling slot having two opposite plugging sections that are arranged along the first direction, said plugging sections being compatible with one of LC, MPO and SC connectors;
    wherein said coupling component comprises:
    a main body that defines said plugging sections of said at least one coupling slot,
    two resilient members that are connected respectively to opposite ends of said main body along a second direction perpendicular to the first direction, and that are resiliently flexible, and
    two stopping members that are connected respectively to said opposite ends of said main body such that each of said resilient members is spaced apart from a respective one of said stopping members along the first direction;
    wherein said casing comprises:
    a surrounding wall that surrounds said receiving slot, and two locking pieces that are connected to said surrounding wall, that are disposed in said receiving slot, and that are opposite to each other along the second direction, each of said locking pieces being disposed between a respective one of said resilient members and a respective one of said stopping members such that movements of said coupling component relative to said casing along the first direction are restricted; and
    wherein, when said resilient members are pushed toward said main body, movement of said coupling component in the first direction is not restricted by said resilient members, thereby allowing removal of said coupling component from said receiving slot of said casing.

2. The optical fiber coupling device as claimed in claim 1, wherein said casing further includes:
    an outer ring wall that surrounds and is connected to said surrounding wall; and
    a surrounding end segment that is connected to one of opposite ends of said surrounding wall along the first direction, that cooperates with said surrounding wall to define said receiving slot, and that has an outer surface surrounding an axis which extends along the first direction, and formed with a plurality of angularly spaced-apart helical grooves.

3. The optical fiber coupling device as claimed in claim 2, wherein said outer ring wall of said casing surrounds and is connected to an outer surface of said surrounding wall, said casing further including an external thread that is formed in said outer surface of said surrounding wall.

4. The optical fiber coupling device as claimed in claim 3, further comprising a securing ring that surrounds said casing and that is removably and threadedly engaged with said external thread of said casing.

5. The optical fiber coupling device as claimed in claim 1, wherein said casing further includes:
    an outer ring wall that surrounds and is connected to said surrounding wall; and
    two surrounding end segments that are connected respectively to opposite ends of said surrounding wall along the first direction, and that cooperate with said surrounding wall to define said receiving slot, each of said surrounding end segments having an outer surface surrounding an axis which extends along the first direction, and formed with a plurality of angularly spaced-apart helical grooves.

6. The optical fiber coupling device as claimed in claim 5, wherein said outer ring wall of said casing surrounds and is connected to an outer surface of said surrounding wall, said casing further including an external thread that is formed in said outer surface of said surrounding wall.

7. The optical fiber coupling device as claimed in claim 6, further comprising a securing ring that surrounds said casing and that is removably and threadedly engaged with said external thread of said casing.

* * * * *